(12) United States Patent
Fisenko

(10) Patent No.: US 6,615,821 B1
(45) Date of Patent: Sep. 9, 2003

(54) CAMP STOVE

(75) Inventor: Igor G. Fisenko, Clackamas, OR (US)

(73) Assignee: Mark S. Stevens Industries, Inc., Salem, OR (US)

( * ) Notice: Subject to any disclaimer, the term of this patent is extended or adjusted under 35 U.S.C. 154(b) by 0 days.

(21) Appl. No.: 10/217,900

(22) Filed: Aug. 13, 2002

(51) Int. Cl.[7] .............................. F24C 1/14; F24C 15/36
(52) U.S. Cl. ...................... 126/25 R; 126/77; 126/201; 126/15 R
(58) Field of Search ............................... 126/25 R, 9 R, 126/30, 58, 77, 201, 298, 15 R

(56) References Cited

U.S. PATENT DOCUMENTS

| | | | | |
|---|---|---|---|---|
| 164,592 A | * | 6/1875 | Pierce | 126/83 |
| 1,743,072 A | * | 1/1930 | Moe | 126/58 |
| 4,730,597 A | * | 3/1988 | Hottenroth et al. | 126/2 |
| 6,520,173 B2 | * | 2/2003 | Lautner | 126/9 R |

* cited by examiner

Primary Examiner—Alfred Basichas
(74) Attorney, Agent, or Firm—Carl D. Crowell

(57) ABSTRACT

A portable stove and heater adapted for outdoor or camp use. The stove is comprised of at least three concentric walls affixed to a floor with vents placed in each of the walls to permit multiple pathways for transiting air to be heated prior to entering a combustion chamber.

11 Claims, 5 Drawing Sheets

CAMP STOVE

BACKGROUND OF THE INVENTION

I. Field of the Invention

The present invention relates to stove and heater devices and, more particularly, to stove and heater devices for camp use with foraged fuel.

II. Description of the Prior Art

Frequently, outdoorsmen such as fishermen and hunters spend a considerable amount of time in a particular location during cold weather. Containers for building fires for cooking food and heating the body while outdoors are well known.

Problems with prior art devices include that they are subject to blow out or sparking in windy conditions. Many have vents that permit direct air access to combustible material, allowing wind to blow directly onto flames causing sparks and burning material to be ejected creating a fire hazard. Often devices are designed such that hot or burning material may fall out of the bottom.

Other problems with prior art include the fact that the exterior of the device while in use will become hot enough to quickly ignite material on contact creating a fire hazard.

Previous designs have also required or contained cross-welded or joined members. In the heating of a cylinder, there is often thermal expansion. Prior art devices have suffered from uneven expansion of components that leads to metal fatigue and component failure, particularly at welds.

OBJECTIVES OF THE INVENTION

The present invention provides a stove or heater that burns foraged fuel efficiently and safely. The device is sturdy and easily constructed. The device also provides improved safety over prior art, reducing the risk of uncontrolled burning.

The construction of the device is such that all primary components may be joined on a floor, largely by the use of non-welded metal tabs. Items subjected to thermal stress expand and contract causing wear and fatigue leading to component failure. There is a useful need for a stove that is assembled in manner that permits free expansion of components under heat.

The device provides improved combustion of fuel. Warmed air burns more readily. The present device channels warmed air to both a primary burn chamber where fuel is consumed, and also provides an alternate air pathway for air to be warmed and fed into the hot gasses expelled from the burning fuel for secondary combustion.

Safety features of the device include a layout of the components that provide an inexpensive system of guardrails for ease of handling and moving the device and to prevent inadvertent contact with hot components. The multiple walled structure of the device also permits useful radiant heat from the outer wall, without developing a dangerously hot surface.

Additional safety features and improved characteristics are in the series of offset vents that supply air to the primary and secondary burn areas. Wind is not permitted to blow directly into the burn chamber and thus excessive sparking is avoided. The bottom half of the unit is also completely enclosed so that there is no spillage of burning or hot fuel or ash.

SUMMARY OF THE PRESENT INVENTION

The present invention provides a compact and easily transportable camp stove and heater device. A multi-walled container having an elongated cylindrical body with an opening at a top end and a closed bottom portion is provided for containing fuel and a fire. The container is comprised of a series of nested wall, including an outer wall, a middle wall and an inner wall. The walls have a series of vents to provide air to the burn chamber located within the inner wall.

The nested walls are concentric. Each wall is affixed to a floor. The floor is to both contain and define the lower boundary of the burn chamber and provide an air chamber between the floor and a base plate that extends beyond the floor and the outer diameter of the outer wall to improve stability.

The inner wall is capped with an inner cap. The inner cap is generally ring shaped with a central opening. The inner cap defines the upper boundary of the burn chamber. The central opening of the inner cap provides access to the burn chamber for the insertion of fuel and removal of waste and ash.

An outer cap caps the device displaced above the inner cap. The outer cap is also generally ring shaped with a central opening. In the preferred embodiment the outer cap is placed above the inner cap so as to permit airflow, but placed below the upper edge of the outer wall so that the outer wall extends above the outer cap forming a raised lip.

The vents of the device are located so as to provide a more efficient stove with improved safety characteristics. The vents on the outer wall are located medially, with a distance of the outer wall both above and below the outer wall vents.

The middle wall vents may be located at any point. In the preferred embodiment the middle wall vents are in the form of horizontal slots located in the lower portion of the middle wall.

The inner wall vents are located proximate the base plate. In the preferred embodiment they are vertical slots placed equidistant around the circumference of the inner wall extending upward.

The vents of each of each of the three walls comprise an approximately equal area to permit clear airflow. This preferred area is the approximate area of the inner cap central opening. The cross sectional area available for airflow between the inner cap and the outer cap is also of this same approximate area.

Assembly is principally through the use of non-welded tabs. The majority of the components are held in place by the use of receiver slots and metal tabs permitting expansion of contraction of the elements when under thermal stress.

BRIEF DESCRIPTION OF THE DRAWINGS

A better understanding of the present invention will be had upon reference to the following detailed description, when read in conjunction with the accompanying drawings, wherein like reference characters refer to like parts throughout the several views, in which.

DETAILED DESCRIPTION

Figure 4:
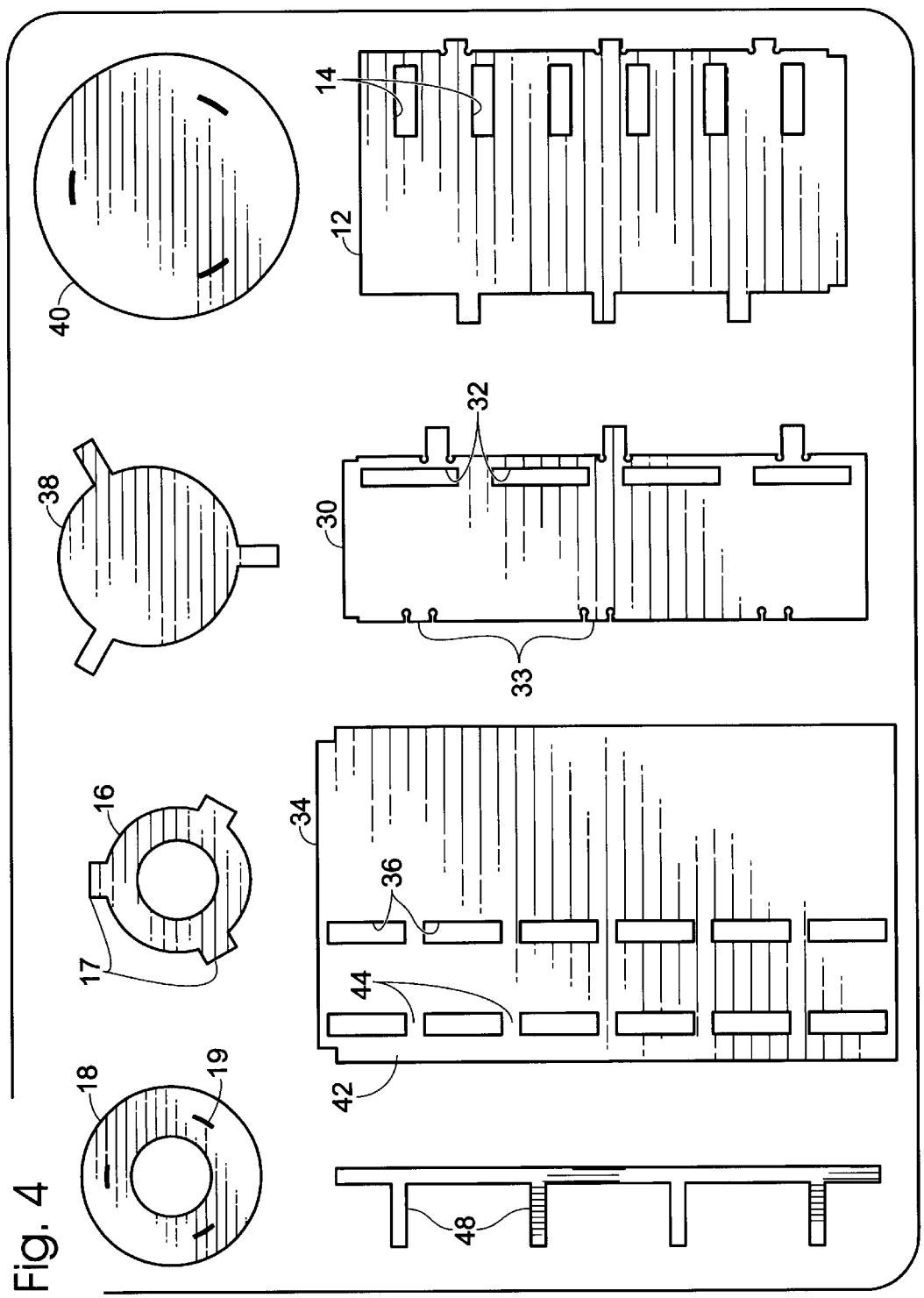
FIG. 4 is a layout of the raw components of the invention, pre-assembly.

The preferred embodiment of the invention comprises an inner wall 12, a middle wall 30 and an outer wall 34, a base 40, a floor 38, an inner cap 16 and an outer cap 18. These elements may be cut or stamped from stainless steel or any suitable material able to withstand the heat of regular operation. The form of the raw components pre-assembly and prior to shaping is depicted in FIG. 4.

Disposed along the lower portion of the inner wall 12 are a series of inner wall vents 14 extending vertically from the portion of the wall affixed to the floor 38. The inner wall 14 is capped with an inner cap 16. The inner cap 16 is generally ring shaped with a central opening 22. In the preferred embodiment the central opening 22 is approximately one half the diameter of the inner wall 14. The outer diameter of the inner cap 16 ring is slightly greater than the diameter of the inner wall 14. The inner cap 16 defines the upper boundary of the burn chamber 20. The central opening of the inner cap 16 provides access to the burn chamber 20 for the insertion of fuel and removal of waste and ash.

Figure 1:
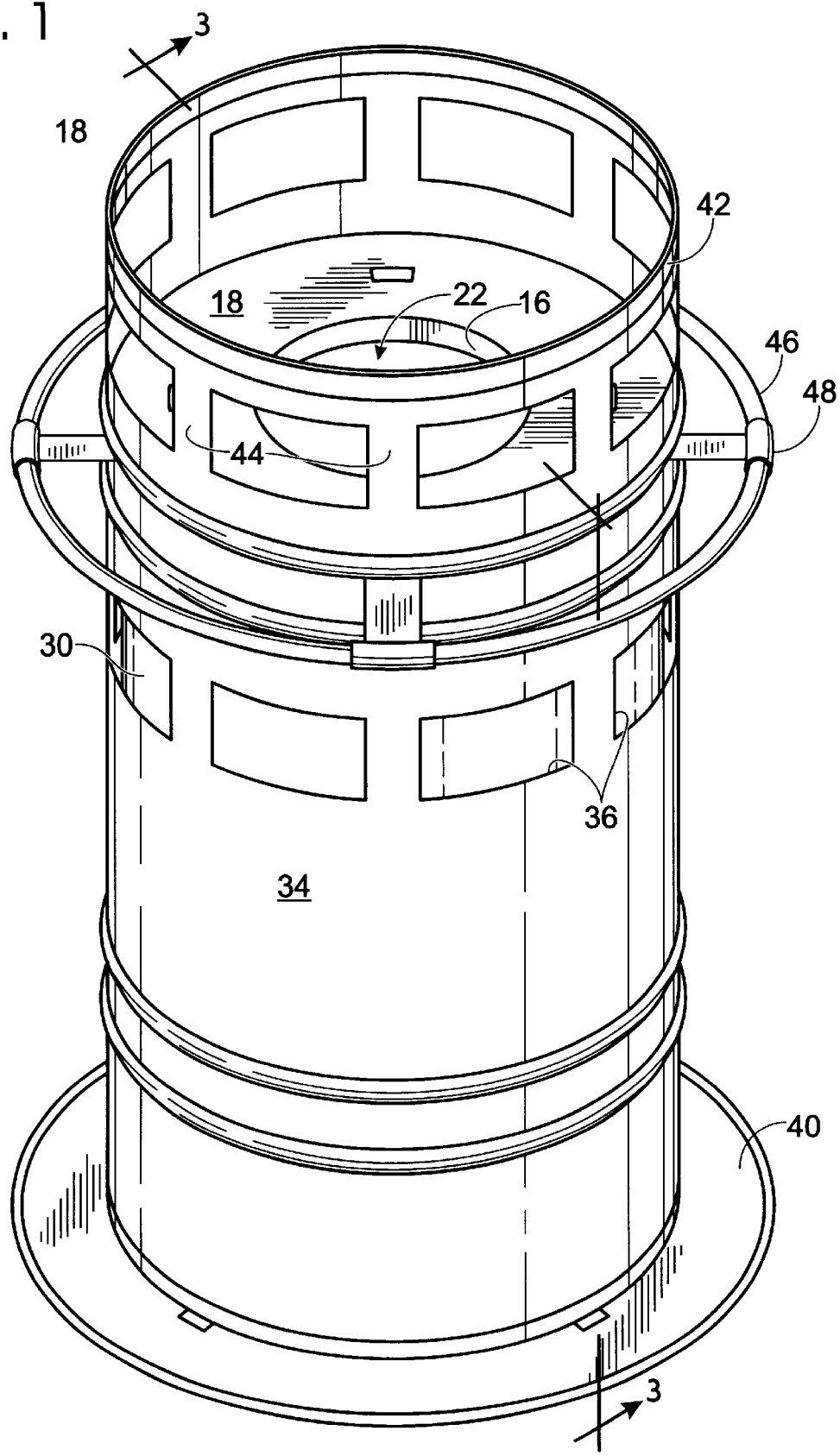
FIG. 1 is a perspective view of the camp stove according to the invention.
Figure 2:
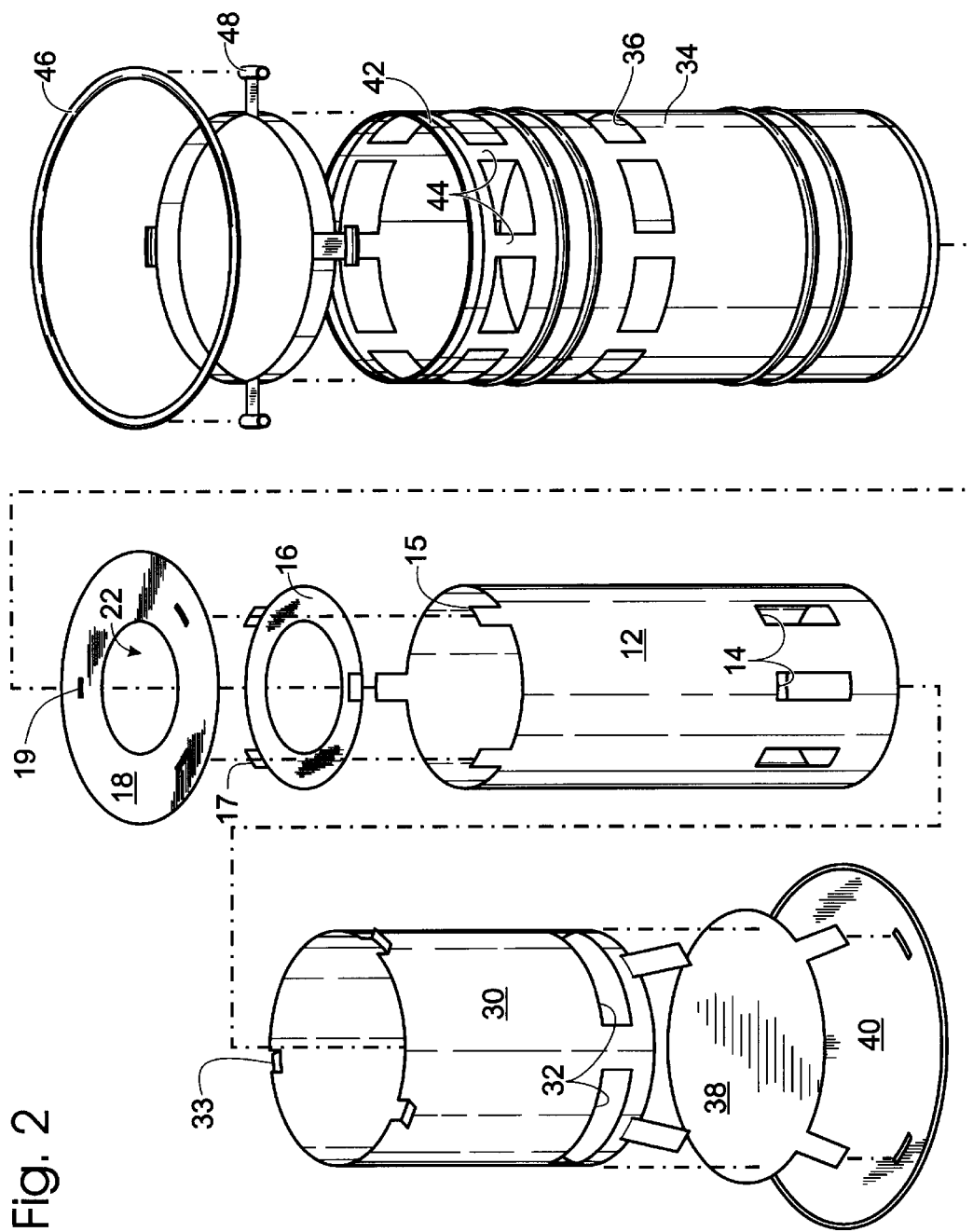
FIG. 2 is an exploded perspective view.
Figure 3:
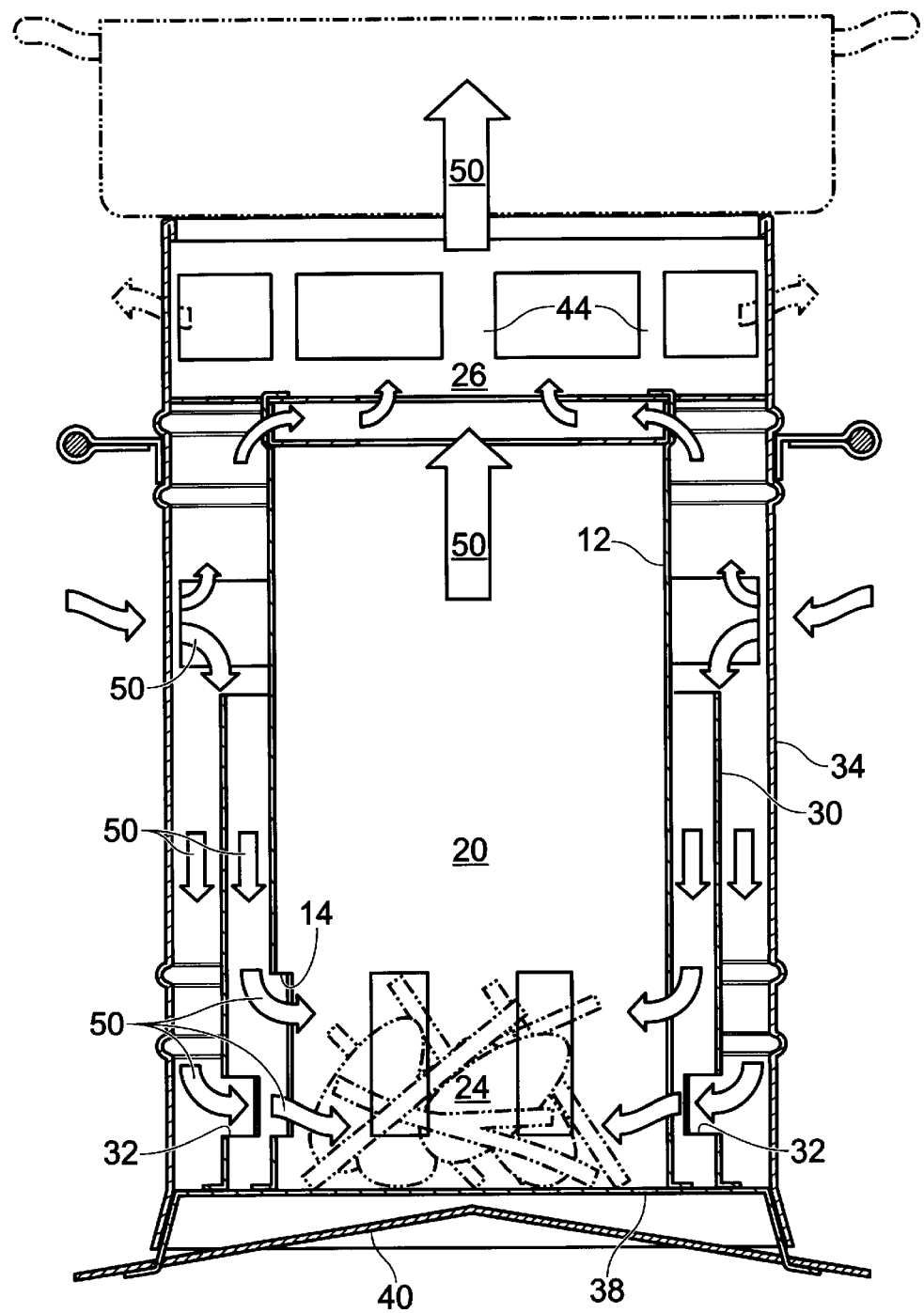
FIG. 3 is a cross-sectional view showing the camp stove of FIG. 1 taken along lines 3—3.

A generally ring shaped outer cap 18 caps the device displaced above the inner cap 16. Preferably, the spacing between the outer cap 18 and the inner cap 16 is maintained by a series of inner cap tabs 17 folded upward which support the outer cap. The outer cap 18 retains the inner cap 16 by receiving a series of inner wall tabs 15 disposed along the upper edge of the inner wall 12 which are inserted through a series of slots 19 in the outer cap 18 and then folded to hold the outer cap 18 in place. An exploded view of the assembly is depicted in FIG. 2. The outer cap 18 diameter is such that it resides within the outer wall 34 and is disposed below the upper portion of the outer wall 34 below the upper rail posts 44.

The outer wall 34 has disposed medially a series of vents 36. In the preferred embodiment the outer wall 34 extending above the outer cap 18 is cut so as to form posts 44 and an upper rail 42. The upper rail 42 provides a support for cookware and operates as both a protective rail and a handle.

Disposed around the outer wall 34 are a series of outer rail posts 48 on which is mounted an outer rail 46 providing both a secondary protective rail and another handle.

The middle wall 30 has a series of middle wall vents 32 to permit cross flow of air. The upper portion of the middle wall 30 extends to a height approximately equal to the outer wall vents 36. The upper edge of the middle wall may have a series of tabs 33 in place to provide spacing between the inner wall 12 and the middle wall 30.

The inner wall 12 and middle wall 30 rest on the floor 38 and are held in place by a series of tabs as is the floor 38, which is suspended above and held to the base 40 by tabs being inserted into to slots on the base 40.

The base 40 extends beyond the diameter of the outer wall and is preferably slightly conical permitting the outer parameter to rest on the ground or substrate improving stability. The conical shaping also elevates the burn chamber 20 above any substrate on which he device is placed, providing additional airspace to prevent excessive heat transfer to the substrate.

Figure 6:
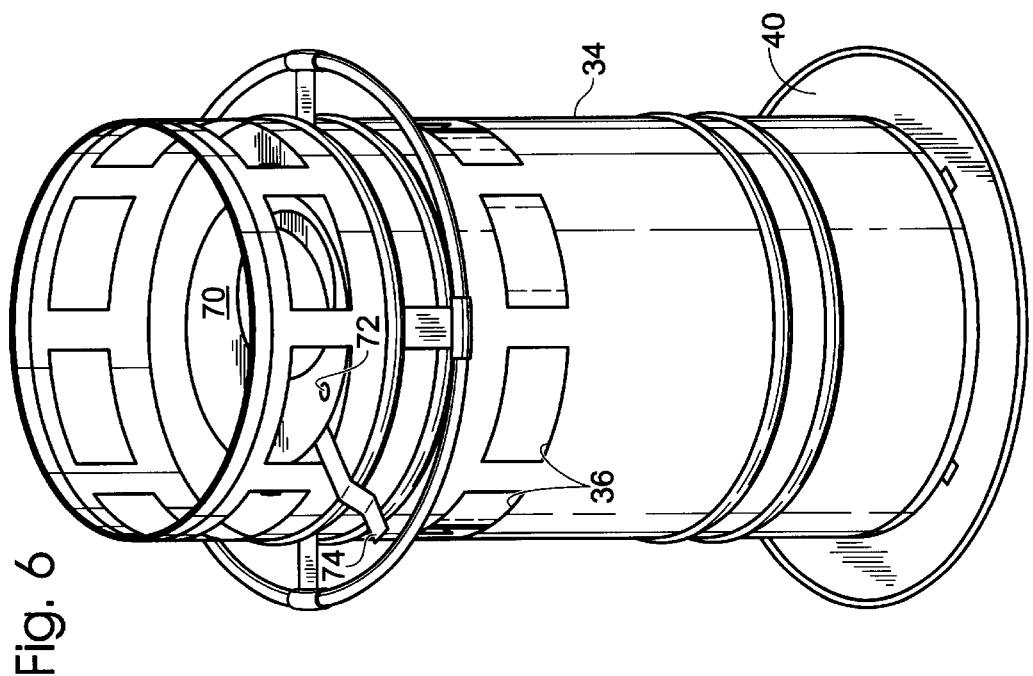
FIG. 6 is an alternate embodiment of the invention with a damper.

Alternate embodiments include the use of a damper 70 as depicted in FIG. 6. The damper 70 may be placed over the central opening 22 of the outer cap 18. Such a damper 70 may consist of an offset hole in a circular piece of metal with a pivot pin 72 and a handle 74 to swivel the damper 70 permitting the central opening 22 of the outer cap 18 to be selectively occluded limiting air flow 50 and reducing the burn rate. Alternate damper systems, including the placement of gates over the outer wall vents may also be used (not shown).

Figure 5:
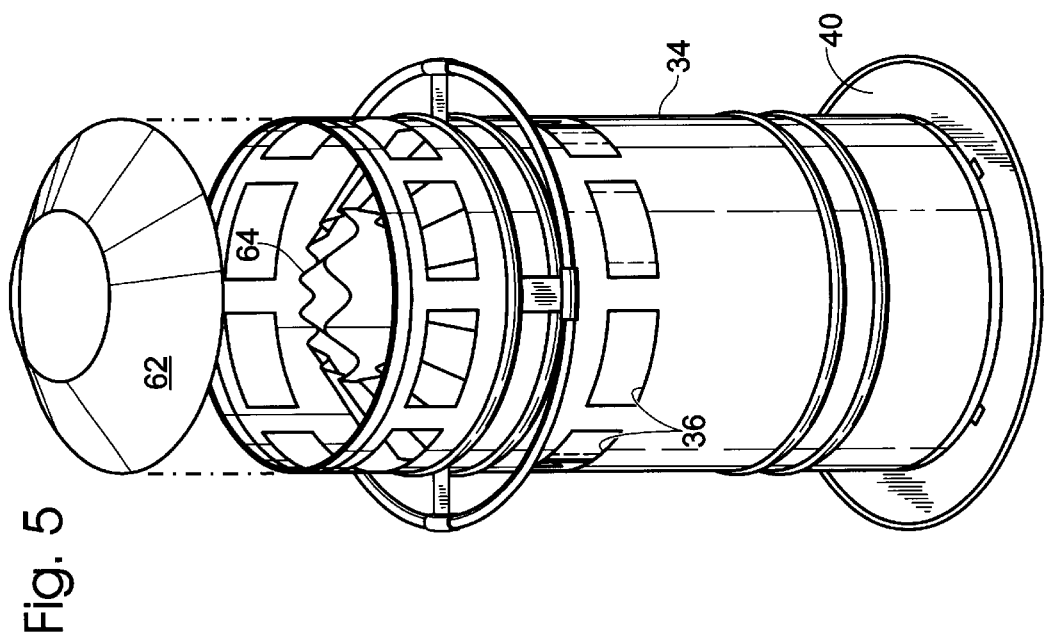
FIG. 5 is an alternate embodiment of the invention with the frustro conical outer cap and undulating inner cap.

In another alternate embodiment depicted in FIG. 5, the inner cap 64 is formed so as to be folded along the central opening of the inner cap 64 to increase the boundary layer area of air entering the secondary burn zone. Other disclosed modifications include a frustro-conical outer cap 62.

OPERATION

In operation, fuel is added to the burn chamber 20 through the outer cap 18 central opening 22 and the inner cap 16 central opening. The fuel is the lighted in any number of conventional ways, though lighting is facilitated if the stove is inverted during initial ignition.

Once ignited, additional fuel may be added while the stove is in use.

Airflow is indicated generally at 50. For primary combustion air flow 50 is from the outer wall vents 36 down both sides of the middle wall 30 with the outer air pathway transiting through the middle wall vents 32 then through the inner wall vents 14. The three walls heat air, the middle wall 30 acting as both a heat shield to prevent excessive heating of the outer wall 34 and as a radiant fin to heat the air passing by both sides toward the inner wall vents 14. Heated air increases the efficiency of the combustion process and the multiple walled structure of the invention facilitates heating the air by providing increased air contact with the walls of the stove, which become heated when in use.

An alternate air pathway 50 is provided to permit the combustion of unburned gasses produced by the burning fuel. Air is permitted to enter through the outer wall vents 36 and travel upward through the space defined by the inner wall 12 and the outer wall 30 and then exit the space defined by the outer cap 18 and the inner cap 16 to provide additional oxygen to burn any unconsumed gasses exiting the burn chamber 20.

While the invention has been illustrated and described in detail in the drawings and the foregoing description, the same is to be considered as illustrative and not restrictive in character, it being understood that only the preferred and select alternate embodiments have been shown and described fully and that all changes and modifications that come within the spirit of the invention are desired to be protected.

I claim:

1. A stove comprising:
   An inner wall,
   an outer wall, and
   an at least one middle wall, each nested and affixed concentrically to a floor,
   each of said walls with an at least one or more vents,
   said inner wall capped with an inner cap,
   said inner cap being generally ring shaped with an inner cap central opening,
   said outer wall capped with an outer cap, said outer cap placed above said inner cap,
   said outer cap being generally ring shaped with an outer cap central opening.

2. The stove of claim 1 wherein said outer wall vents are medially displaced.

3. The stove of claim 1 wherein said inner wall vents are of a generally vertical orientation displaced along the bottom of said inner wall and extending upward.

4. The stove of claim 1 wherein assembly is accomplished principally through the use of folded tabs inserted into slots.

5. The stove of claim 1 wherein said floor is disposed above and affixed to a base.

6. The stove of claim 5 where in said base is slightly conical.

7. The stove of claim 1 further comprising a flue to selectively occlude airflow.

8. The stove of claim 1 wherein said inner cap is folded to form an undulating boundary layer along the inner cap central opening.

9. The stove of claim 1 further comprising an at least one or more outer rail posts affixed to said outer wall, said outer rail posts retaining an outer rail.

10. The stove of claim 1 further comprising an at least one or more upper rail posts disposed along said outer wall and affixed to said upper rail posts an upper rail.

11. The stove of claim 10 wherein said upper rail posts and said upper rail are formed from and integral to said outer wall.

* * * * *